(12) United States Patent
Karasawa et al.

(10) Patent No.: US 6,793,352 B2
(45) Date of Patent: Sep. 21, 2004

(54) PROJECTOR WIRELESS CONTROL SYSTEM AND WIRELESS CONTROL METHOD

(75) Inventors: Toru Karasawa, Shiojiri (JP); Shoichi Akaiwa, Matsumoto (JP); Tomohiro Nomizo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/323,849

(22) Filed: Dec. 20, 2002

(65) Prior Publication Data

US 2003/0117532 A1 Jun. 26, 2003

(30) Foreign Application Priority Data

Dec. 25, 2001 (JP) ........................................ 2001-391117

(51) Int. Cl.⁷ .......................... G03B 21/00; H04N 7/173
(52) U.S. Cl. .......................... 353/122; 353/42; 353/121; 725/109; 725/123
(58) Field of Search ............................. 353/30, 31, 94, 353/42, 121, 122; 348/14.02, 14.05, 211.2, 211.3, 211.4, 211.5, 211.6, 211.7; 725/109, 123, 126, 133

(56) References Cited

U.S. PATENT DOCUMENTS

| 6,302,698 B1 | * | 10/2001 | Ziv-El .......................... 434/323 |
| 6,323,893 B1 | * | 11/2001 | Tosaya ..................... 348/14.08 |
| 6,437,836 B1 | * | 8/2002 | Huang et al. ............... 348/734 |
| 6,522,352 B1 | * | 2/2003 | Strandwitz et al. ....... 348/211.2 |
| 2002/0163548 A1 | * | 11/2002 | Chiu et al. ................... 345/864 |
| 2003/0017846 A1 | * | 1/2003 | Estevez et al. ............. 455/556 |
| 2003/0117587 A1 | * | 6/2003 | Olson et al. ................... 353/30 |
| 2003/0120849 A1 | * | 6/2003 | Roslak et al. ............... 710/303 |

* cited by examiner

Primary Examiner—Russell Adams
Assistant Examiner—Andrew Sever
(74) Attorney, Agent, or Firm—Oliff & Berridge, PLC (57) ABSTRACT

A projector and a mobile terminal are connected wirelessly in two-way communication, and thus the projector is controlled by the mobile terminal. Also, projection data is exchanged between the mobile terminal and the projector, or between a data server connected to a network and the projector using a command of the mobile terminal. Furthermore, when a plurality of mobile terminals send projection data simultaneously, a communication enabled state is established with only one mobile terminal by a predetermined procedure, or one projector's projection screen is divided in order to project a plurality of projection data simultaneously.

26 Claims, 10 Drawing Sheets

PROJECTOR WIRELESS CONTROL SYSTEM AND WIRELESS CONTROL METHOD

BACKGROUND OF THE INVENTION

1. Field of the Invention

The present invention relates to control of a projector using a mobile terminal which performs communication by wireless connection.

2. Description of the Related Art

Figure 15:
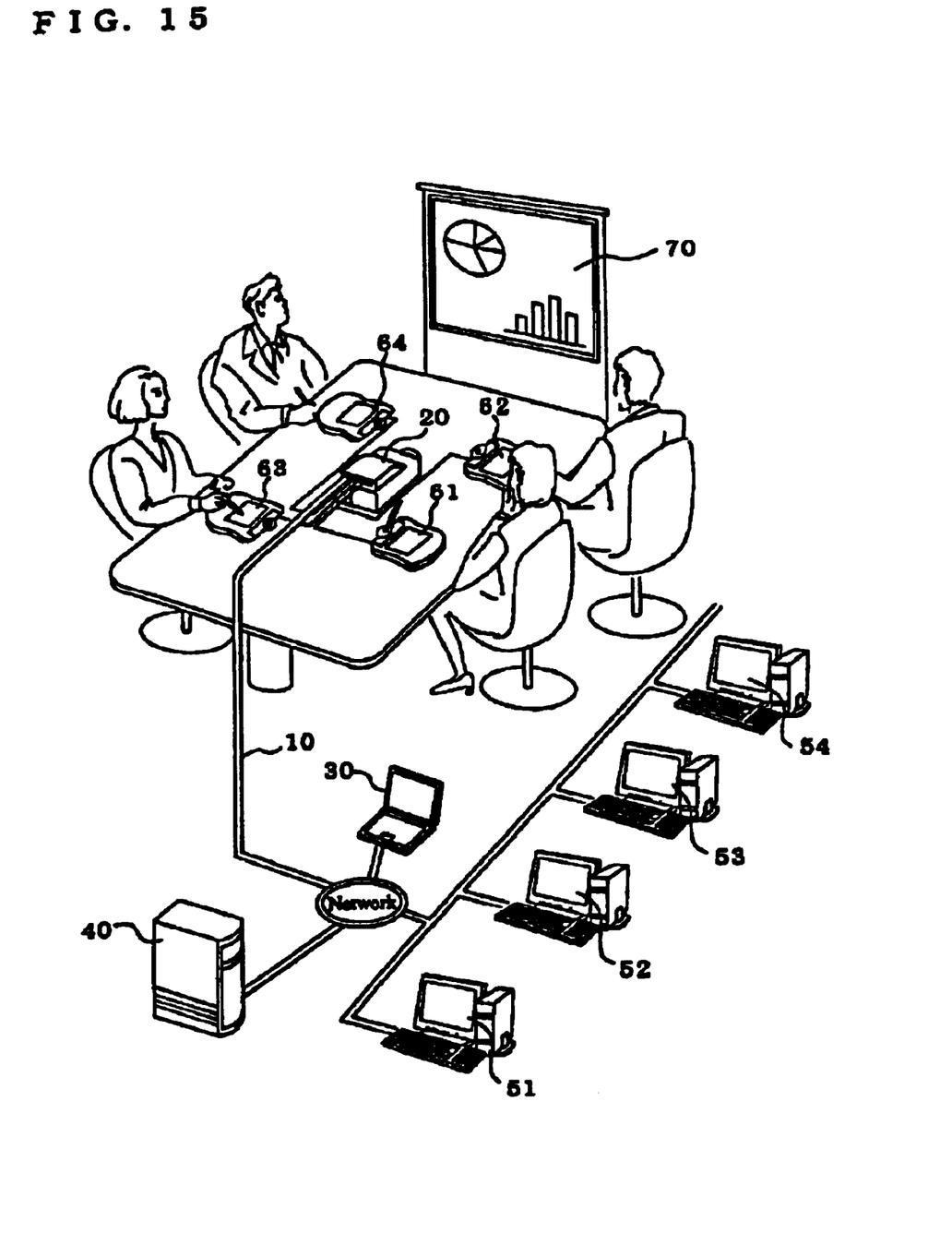
FIG. 15 is a configuration diagram illustrating an example of the conventional projector system connected to a network.

FIG. 15 is a configuration diagram illustrating an example of the conventional projector system connected to a network. In FIG. 15, a projector 20, a notebook-sized personal computer 30, a server 40, desktop personal computers 51, 52, 53, and 54 are individually connected to a network 10. Furthermore, tablets 61, 62, 63, and 64 are directly connected to the projector 20.

Control information and projection data from the notebook-sized personal computer 30 are sent to the projector 20 through the network 10, and the data is projected onto the projection screen 70. Also, the notebook-sized personal computer 30 sends the control information to the server 40 or desktop personal computers 51, 52, 53, and 54 through the network 10. Projection data stored in the server 40 or the desktop personal computers 51, 52, 53, and 54 is sent to the projector 20 based on the control information.

Accordingly, for example, by just bringing the projector 20 and the notebook-sized personal computer 30 in a conference room, projection data stored in the desktop personal computers 51, 52, 53, and 54, or the server 40, which are located in another place, can be projected by desire.

Further, from the tablets 61, 62, 63, and 64, drawings can be directly entered and projected, or lines can be inserted onto the projected data.

Furthermore, if the projection data has been sent to the projector 20 in advance, the projection data can be projected in a disconnected state to the network 10 or independent of the notebook-sized personal computer 30.

The conventional projector system is configured as described above, and it is possible to project projection data stored in a personal computer or a server located apart from the place where the projector is located. Thus the projector system contributes to share information and to increase projection efficiency.

However, the operation control of the projector 20 is performed directly from the operation of the projector 20 itself, or by the direction from the notebook-sized personal computer 30. Thus only the person sitting near the projector 20 or the notebook-sized personal computer 30 can control the projector. Also, though a projector has been operated by a remote control so far, the projector and the remote control have not been connected in two-way communication. Thus projection data or the like cannot be sent/received from/to these devices, so that the image projected on the projector cannot be monitored on the remote control.

SUMMARY OF THE INVENTION

The present invention is made in view of the above-described problems, and it is an object of the present invention to provide a projector control system and control method in which projector projection control and/or projection data sending/receiving or transfer control can be performed at a remote place from the projector, and better operationality is achieved.

The projector wireless control system and control method according to the present invention are as follows:

(1) According to a first aspect of the present invention, there is provided a projector wireless control system including: a projector which includes a network module for communicating with another device, and projects projection data; and a mobile terminal which includes a projector control function for controlling operation of the projector, and is wirelessly connected to the projector, allowing two-way communication with the projector through the network module. By this means, it becomes possible to control the projector with respect to a preset operation from an arbitrary place which is remote from the projector in a communicable area.

(2) In a projector wireless control system according to the first aspect of the present invention, the mobile terminal may include a function of causing the projector to project projection data which the projector has possessed. By this means, the mobile terminal can cause the projector to execute projection.

(3) In a projector wireless control system according to the first aspect of the present invention, the mobile terminal may include a function of sending projection data wirelessly to the projector. By this means, it becomes possible to send projection data from the mobile terminal to the projector.

(4) In a projector wireless control system according to the first aspect of the present invention, the mobile terminal may include a display unit, and has a function of sending wirelessly an image to be displayed on the display unit to the projector and causing the sent image to be projected on the projector. By this means, it becomes possible to project the data while confirming the projection data content.

(5) In a projector wireless control system according to the first aspect of the present invention, the mobile terminal may include a display unit, and has a function of receiving wirelessly an image, which is projected on the projector, and displaying the received image on the display unit. By this means, an operator of the mobile terminal can confirm current projection content of the projector.

(6) In a projector wireless control system according to the first aspect of the present invention, a projection data storage server which is connected to the projector through the network module, wherein the mobile terminal has a function of causing the projector to send/receive projection data to/from the storage server. By this means, it becomes possible to operate sending/receiving a file between the projector and the storage server from the mobile terminal.

(7) In a projector wireless control system according to the first aspect of the present invention, the mobile terminal may include a remote control function of performing projection operation of the projector. By this means, projection of the projector can be operated by remote control using the mobile terminal.

(8) In a projector wireless control system according to the first aspect of the present invention, the mobile terminal may include a tablet function of entering a drawing capable of being projected by the projector. By this means, a drawing can be entered from the mobile terminal into the projector to be projected.

(9) In a projector wireless control system according to the first aspect of the present invention, the mobile terminal may include a keyboard function of entering information to the projector. By this means, the mobile terminal can be used as a keyboard of the projector.

(10) In a projector wireless control system according to the first aspect of the present invention, a plurality of the mobile terminals may be provided for one unit of the projector. By this means, a plurality of persons can perform projection operations, etc. individually on one unit of projector in a conference, etc.

(11) In a projector wireless control system according to the first aspect of the present invention, a plurality of the projectors may be provided for one unit of the mobile terminal. By this means, a plurality of projectors can be projected simultaneously or controlled simultaneously by one unit of mobile terminal.

(12) According to a second aspect of the present invention, there is provided a projector wireless control method of controlling a projector wirelessly, which uses a system comprising: a projector which includes a network module for communicating with another device and projects projection data; and a mobile terminal which includes a projector control function for controlling operation of the projector, and is wirelessly connected to the projector for allowing two-way communication with the projector through the network module, wherein the method comprises a step of wirelessly sending a control signal from the mobile terminal to the projector to control the projector. By this means, it becomes possible to control the projector with respect to a preset operation from an arbitrary place which is remote from the projector located within a communicable area.

(13) In a projector wireless control method according to the second aspect of the present invention, the method may further include a sending step in which the mobile terminal sends a projection control signal to the projector; and a projecting step in which the projector projects projection data, which the projector has possessed, based on the projection control signal. By this means, it becomes possible to project projection data possessed by the projector using the mobile terminal.

(14) In a projector wireless control method according to the second aspect of the present invention, the method may further include: sending step in which the mobile terminal sends projection data and a projection control signal to the projector; and projecting step in which the projector projects the projection data based on the projection control signal. By this means, it becomes possible to send projection data from the mobile terminal to the projector to project the data.

(15) In a projector wireless control method according to the second aspect of the present invention, the method may further include: sending step in which the mobile terminal sends a projection data transfer signal to the projector; and sending step in which the projector sends projection data, which the projector has possessed, to the mobile terminal based on the projection data transfer signal. By this means, it becomes possible to send projection data from the projector to the mobile terminal.

(16) In a projector wireless control method according to the second aspect of the present invention, the mobile terminal includes a display unit, and the method may further include: sending step in which the mobile terminal sends a projection data transfer signal to the projector; a sending step in which the projector sends projection data which is projected on the projector, to the mobile terminal based on the projection data transfer signal; and a displaying step in which the mobile terminal displays the projection data to the display unit of the mobile terminal. By this means, it becomes possible to view an image projected by the projector from the mobile terminal too.

(17) in a projector wireless control method according to the second aspect of the present invention, the system further comprises a projection data storage server connected to the projector through the network module, and the method further may includes: a sending step in which the mobile terminal sends a projection data read signal to the projector; and a reading step in which the projector reads projection data stored in the storage server into the projector based on the projection data read signal. By this means, the projector can import projection data stored in the storage server, and makes ready for projection.

(18) In a projector wireless control method according to the second aspect of the present invention, the method may further include: a requesting step in which the mobile terminal requests download of a predetermined application file which the projector has possessed; a sending step in which the projector sends the application file to the mobile terminal based on the request; and a providing step in which the mobile terminal receives an application file and is provided with a function based on the application file.

(19) In the above described (18), the application file may be any one of a remote control application file for controlling projection operation of the projector: a tablet application file for entering a drawing which can be projected by the projector, and a keyboard application file for entering information into the projector. By this means, the mobile terminal can be used as a remote control, a tablet, or a keyboard.

(20) In a projector wireless control method according to the second aspect of the present invention, a plurality of mobile terminals are provided for one unit of the projector, and the method may further include: a sending step in which the mobile terminal sends a connection request to establish communication with the projector, to the projector; and an establishing step in which the projector establishes a communication enabled state with the mobile terminal based on the connection request. By establishing a communication enabled state between the mobile terminal and the projector at the connection request, it becomes possible to prevent unlimited accesses from the mobile terminal to the projector.

(21) In a projector wireless control method according to the second aspect of the present invention, the connection request may not be accepted by the projector in the case when the projector is in a communication enabled state with any one of the mobile terminals. By this means, complication of control in the projector can be avoided.

(22) In a projector wireless control method according to the second aspect of the present invention, when a plurality of the mobile terminals send connection requests to the unit of the projector simultaneously, a communication enabled state may be established between the mobile terminals and the projector in accordance with a predetermined priority.

(23) In a projector wireless control method according to the second aspect of the present invention, when a plurality of the mobile terminals send connection requests to one unit of the projector simultaneously, the projector may give a warning to stop the connection request to each mobile terminal until when only one mobile terminal sends a connection request, and, when only one mobile terminal sends a connection request, the mobile communication enabled state is established between the projector and the mobile terminal.

(24) In a projector wireless control method according to the second aspect of the present invention, when a plurality of the mobile terminals send projection data and a projection control signal to the projector, the projector may project a plurality of each projection data onto one projection screen dividedly. By this means, a plurality of persons can make presentations simultaneously in a conference or the like, and can compare those data.

(25) In a projector wireless control method according to the second aspect of the present invention, one unit of the mobile terminal may control a plurality of the projectors simultaneously. By this means, a plurality of projectors can be controlled effectively by the mobile terminal.

(26) In a projector wireless control method according to the second aspect of the present invention, the unit of the mobile terminal may send projection data to a plurality of the projectors simultaneously to project the projection data on each of the projectors simultaneously. By this means, simultaneous distribution of the same image to a plurality of classrooms, etc. can be achieved easily.

DESCRIPTION OF THE PREFERRED EMBODIMENTS

First Embodiment

Figure 1:
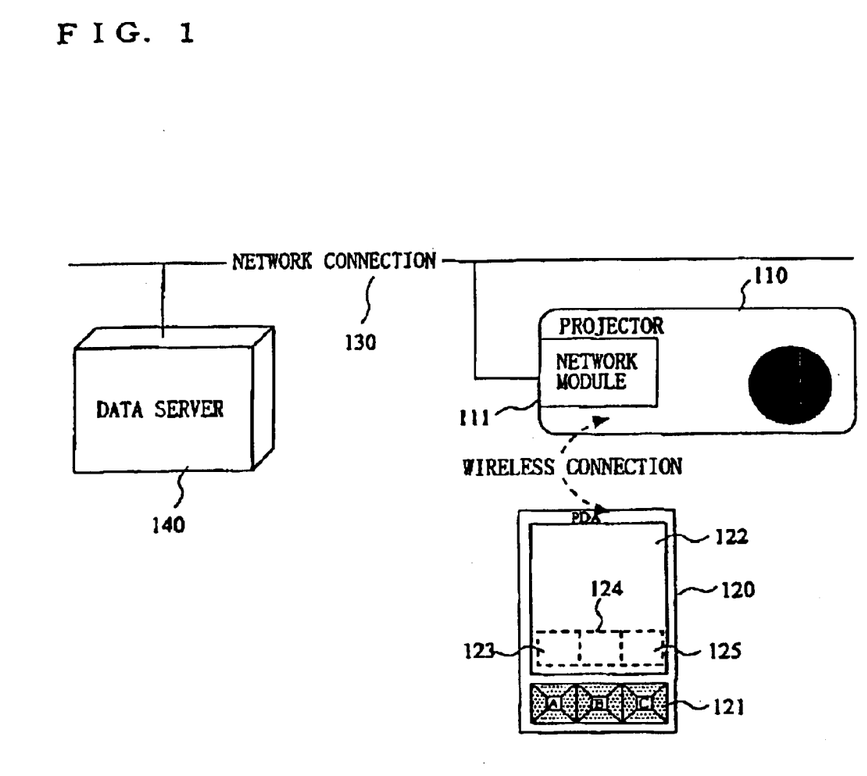
FIG. 1 is a configuration diagram of a projector wireless control system according to an embodiment of the present invention.

FIG. 1 is a configuration diagram of a projector wireless control system according to an embodiment of the present invention. The present system includes a projector 110 which is a projection device having a network module 111 to serve for communication with another device, and a mobile terminal 120 which is wirelessly connected to the projector (for example, network connection), allowing two-way communication with the projector through the network module 111. Also, a data server 140 is connected to the projector 110 through a network line 130 and the network module 111, as necessary.

In this regard, as a mode of wireless connection described above, a wireless LAN, Bluetooth (Bluetooth SIG Inc., a registered trademark in the U.S.A.), etc. can be used. Also, when establishing a state in which the mobile terminal 120 and the projector 110 are capable of communication, first, the mobile terminal 120 may send a connection request to the projector 110, and the projector 110 may establish a communication enabled state with the mobile terminal 120 based on the request.

The mobile terminal 120 is, for example, a PDA (Personal Digital Assistant), a mobile phone, or the like, and includes an operation part 121 which consists of a plurality of keys and data display part 122. Also, a projector control application 123 for controlling the operation of the projector 110 is incorporated in the mobile terminal 120 in advance, and the projector operation set by the application can be controlled.

Furthermore, the mobile terminal 120 can have a file move control application 124 for controlling operations such as move, copy, transfer, etc. of the projection data (in this regard, in the following, presentation data, presentation image, present data, presentation file, etc. are used in the same meaning as the projection data), and projection data 125 to be projected by the projector 110.

In this regard, these control applications and projection data can be entered from a data input terminal (not shown in the figure) at any time.

Figure 2A:
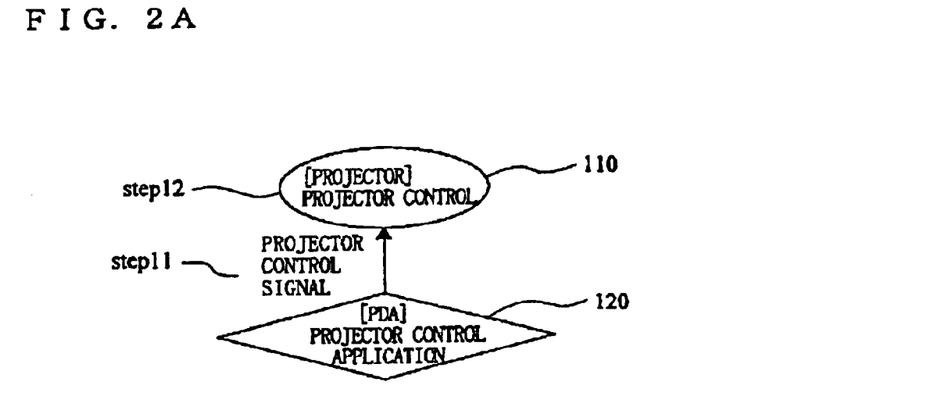
FIG. 2A–FIG. 2C are flow diagrams of projector control and projection data distribution control by the system in FIG. 1.
Figure 2B:
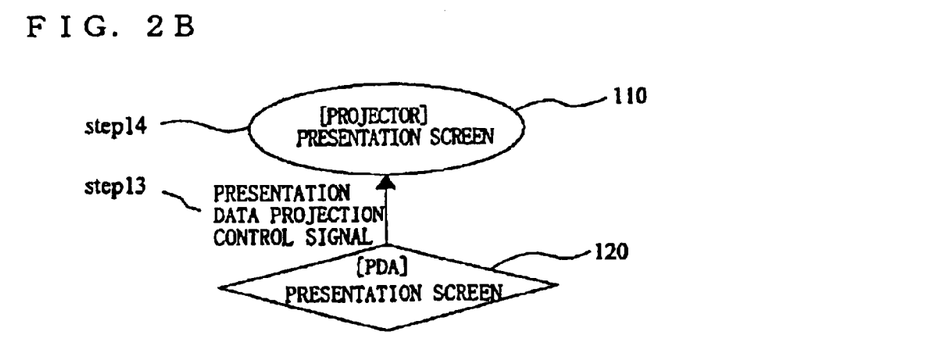
Figure 2C:
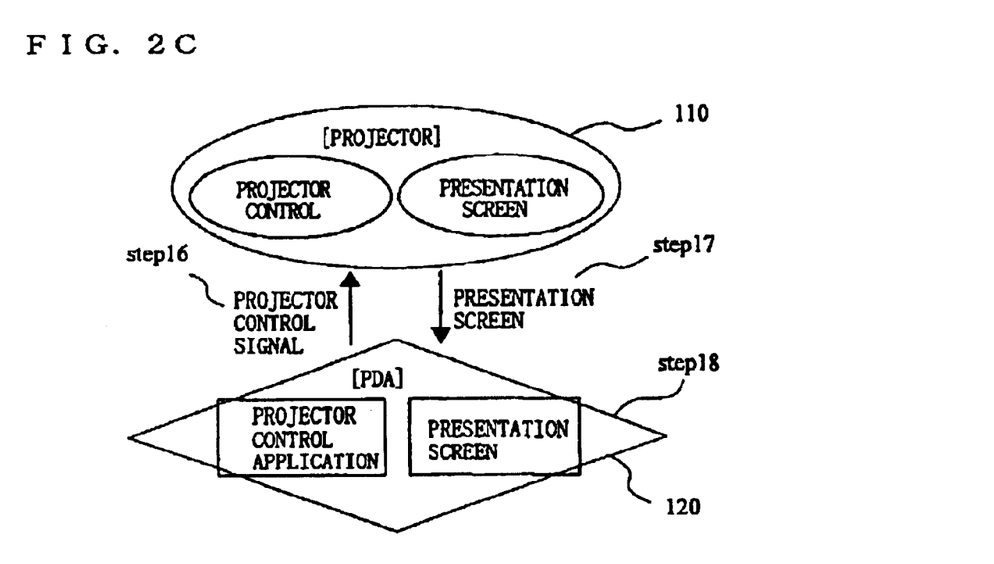

Next, a specific description will be given of the control method in the system in FIG. 1. FIG. 2 is a flow diagram of projector control and projection data distribution control by the system in FIG. 1.

As shown in FIG. 2A, when a projector control signal for controlling the projector 110 is wirelessly sent (step 11) from the mobile terminal 120 to the projector 110, the projector 110 operates in accordance with the projector control signal (step 12).

In this regard, this control is performed using the projector control application 123 installed on the mobile terminal 120.

Also, the types and content of operation control of the projector 110 which can be performed by the mobile terminal 120 are not especially limited, however, they are the content set in the projector control application 123 in advance. Specific examples of the set content are turning ON/OFF of the power of the projector 110, start or stop of projection, adjustment of brightness sound volume or fan revolution speed, enlarging or reducing of a projection screen, switching of a projection screen, and so on.

For example, as shown in FIG. 2B, a typical example of the above-described projector control is a projector projection data distribution control, in which presentation data displayed on a screen 122 of the mobile terminal 120 is sent to the projector 110 together with a projection control signal (step 13), and then the projector 110 projects the presentation data based on the projection control signal (step 14). By this control, for example, a specific presentation screen out of projection data stored in the mobile terminals 120 carried by members of a conference can be projected onto the projector 110 at once, so that information held by each member individually can be shared immediately.

Also, as shown in FIG. 2C, the projector control is possible such that the mobile terminal 120 sends an image sending control signal to the projector 110 (step 16), the projector 110 which has received the image sending control signal sends the image being currently projected by the projector to the mobile terminal 120 (step 17), and further mobile terminal 120 which has received the image from the projector 110 displays the image onto the display part 122 (step 18). By this means, the image projected on the projector 110 can be confirmed by the mobile terminal 120.

Figure 3:
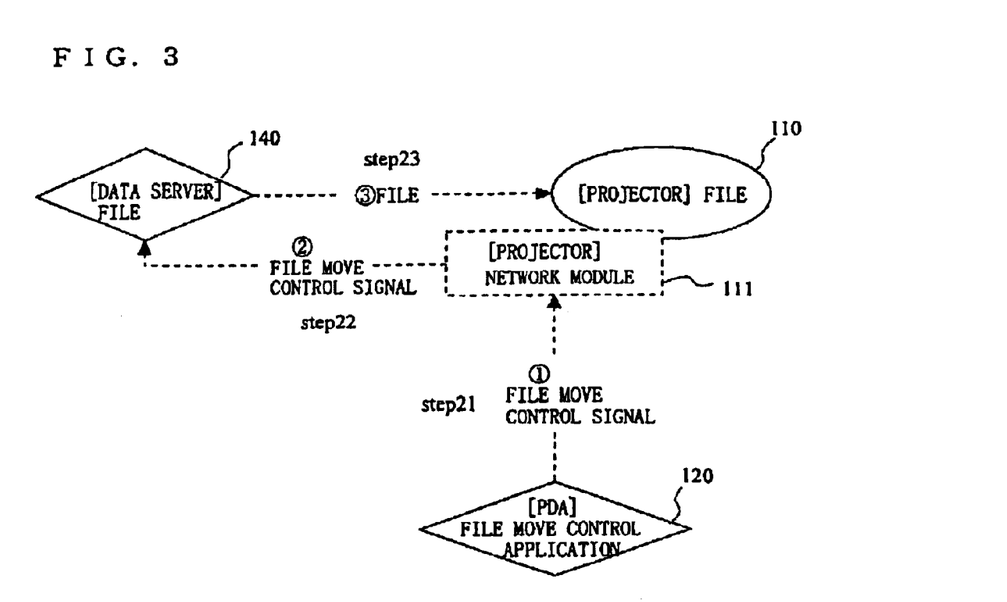
FIG. 3 is a flow diagram of file control by the system in FIG. 1.

FIG. 3 is a flow diagram of file control by the system in FIG. 1. In FIG. 3, the mobile terminal 120 sends a file move control signal to the projector (step 21). The file move control signal is a command for moving or copying a predetermined projection data to the projector 110 out of the projection data stored in the data server 140. When receiving this control signal, the projector 110 sends the file move control signal to the data server 140 on the network through the network line 130 (step 22). Then the data server 140 sends a predetermined projection data to the projector 110 in response to the file move control signal, and the projector 110 obtains the projection data (step 23). Thus the projector 110 can project the projection data which originally exist on the data server 140. In this regard, this control is performed using a file move control application 214 installed on the mobile terminal 120.

Figure 4:
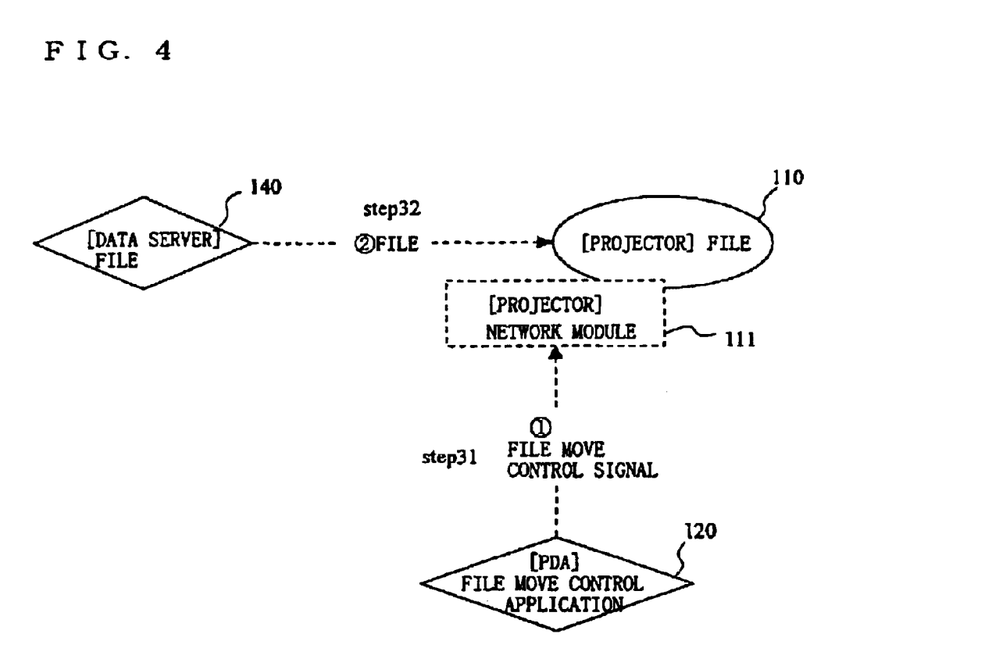
FIG. 4 is another flow diagram of file control by the system in FIG. 1.

FIG. 4 is another flow diagram of file control by the system in FIG. 1. In FIG. 4, when the mobile terminal 120 sends the file move control signal to the projector 110, the projector 110 receives the file move control signal (step 31). The file move control signal is a command for moving or copying the projection data which is projected or held by the projector 110 to the data server 140. When receiving this control signal, the projector 110 sends the specified projection data to the data server 140 on the network through the network line 130 (step 32). Thus since the data server 140 can store the projection data possessed by the projector 110, the projection data can be centrally stored. In this regard, this control is performed using the file move control application 214, too.

Figure 5:
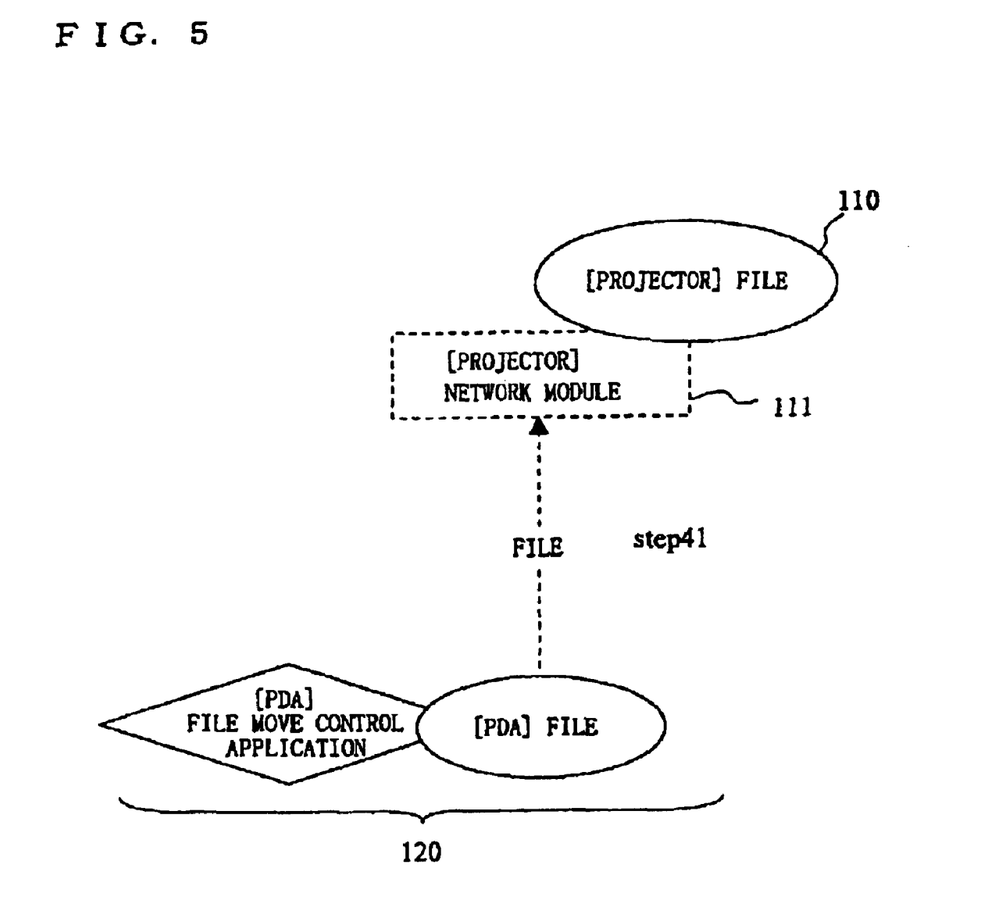
FIG. 5 is still another flow diagram of file control by the system in FIG. 1.

FIG. 5 is still another flow diagram of file control by the system in FIG. 1. In FIG. 5, when the mobile terminal 120 sends projection data 125 possessed by itself to the projector 110, the projector 110 imports the data through a network module 111, and stores the projection data (step 41). Thus it becomes possible for the projector 110 to project the projection data possessed originally by the mobile terminal 120 by a command of the mobile terminal 120. In this regard, the control is performed using the file move control application 214, too. Also, if the control described in FIG. 4 is executed following the processing in FIG. 5, the projection data file possessed by the mobile terminal 120 can be transferred to the data server 140.

Second Embodiment

Figure 6:
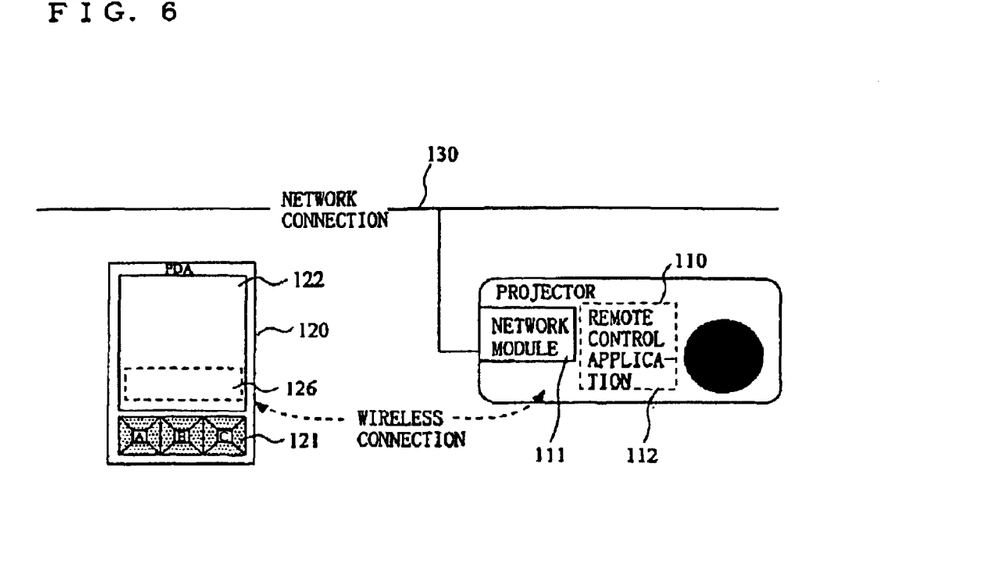
FIG. 6 is a configuration diagram of a projector wireless control system according to another embodiment of the present invention.

FIG. 6 is a diagram illustrating a projector wireless control system according to another embodiment of the present invention. The present system includes a projector 110 which is a projection device having a network module 111 to serve for communication with another device, and a mobile terminal 120 which is wirelessly connected to the projector, allowing two-way communication with the projector through the network module 111. In this regard, as a mode of wireless connection described above, a wireless LAN, Bluetooth (Bluetooth SIG Inc., a registered trademark in the U.S.A.), etc. can be used. In this regard, in FIG. 6, a component having the same reference numeral as in FIG. 1 indicates the same or the equivalent component in FIG. 1.

In FIG. 6, the projector 110 includes a remote control application 112 which enables projection operation b the remote control of the projector. At the same time, the mobile terminal 120 has a network application control module 126 which requests to download the remote control application 112 to the mobile terminal 120. The request operation can be started by the instruction of the operation part 121, however, for example, the network application control module 126 can be set such that if the mobile terminal 120 comes close within a predetermined range of the projector 110, the network application control module 126 starts automatically.

Figure 7:
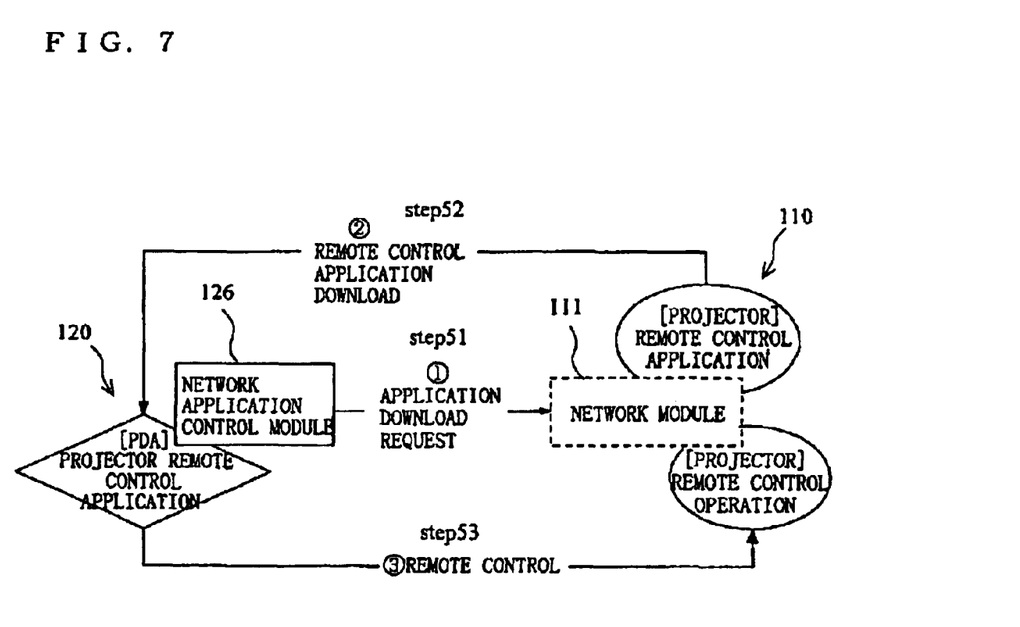
FIG. 7 is a flow diagram of projector control by the system in FIG. 6.

FIG. 7 is a flow diagram illustrating projector control by the system in FIG. 6. In FIG. 7, when the network application control module 126 of the mobile terminal 120 sends a remote application download request, which requests to download the remote control application 112, to the projector 110, the projector 110 receives the request through the network module 111 (step 51). Next, the projector 110 sends the remote control application 112 to the mobile terminal 120 in response to the request (step 52). Thus the remote control application 112 is downloaded to the mobile terminal 120, the mobile terminal 120 obtains the remote control function at that point in time. Accordingly, the mobile terminal 120 can perform projection operation of the projector 110 without preparing a remote control additionally (step 53).

Incidentally, in FIGS. 6 and 7, a description has been given of the example in which the mobile terminal 120 downloads the remote control application 112 for remote control, however, the following modes are also possible. Specifically, when the projector 110 includes a tablet application for entering drawings, if the mobile terminal 120 downloads and obtains the tablet application similarly as in FIG. 7, the mobile terminal 120 can be used as a tablet with which the projector 110 is equipped. Furthermore, when the projector 110 includes a keyboard application for entering information, if the mobile terminal 120 downloads and obtains the keyboard application similarly as in FIG. 7, the mobile terminal 120 can be used as a keyboard with which the projector 110 is equipped.

In this regard, the second embodiment may be combined with the first embodiment or the embodiments described later. In that case, the mobile terminal 120 can obtain the above-described remote control application, tablet application, or keyboard application using the file move control application 124 as described in the first embodiment instead of obtaining each of the applications automatically using the network application control module 126. Also, the mobile terminal 120 may combine the above-described remote control application, tablet application, and keyboard application arbitrarily.

Third Embodiment

Figure 8:
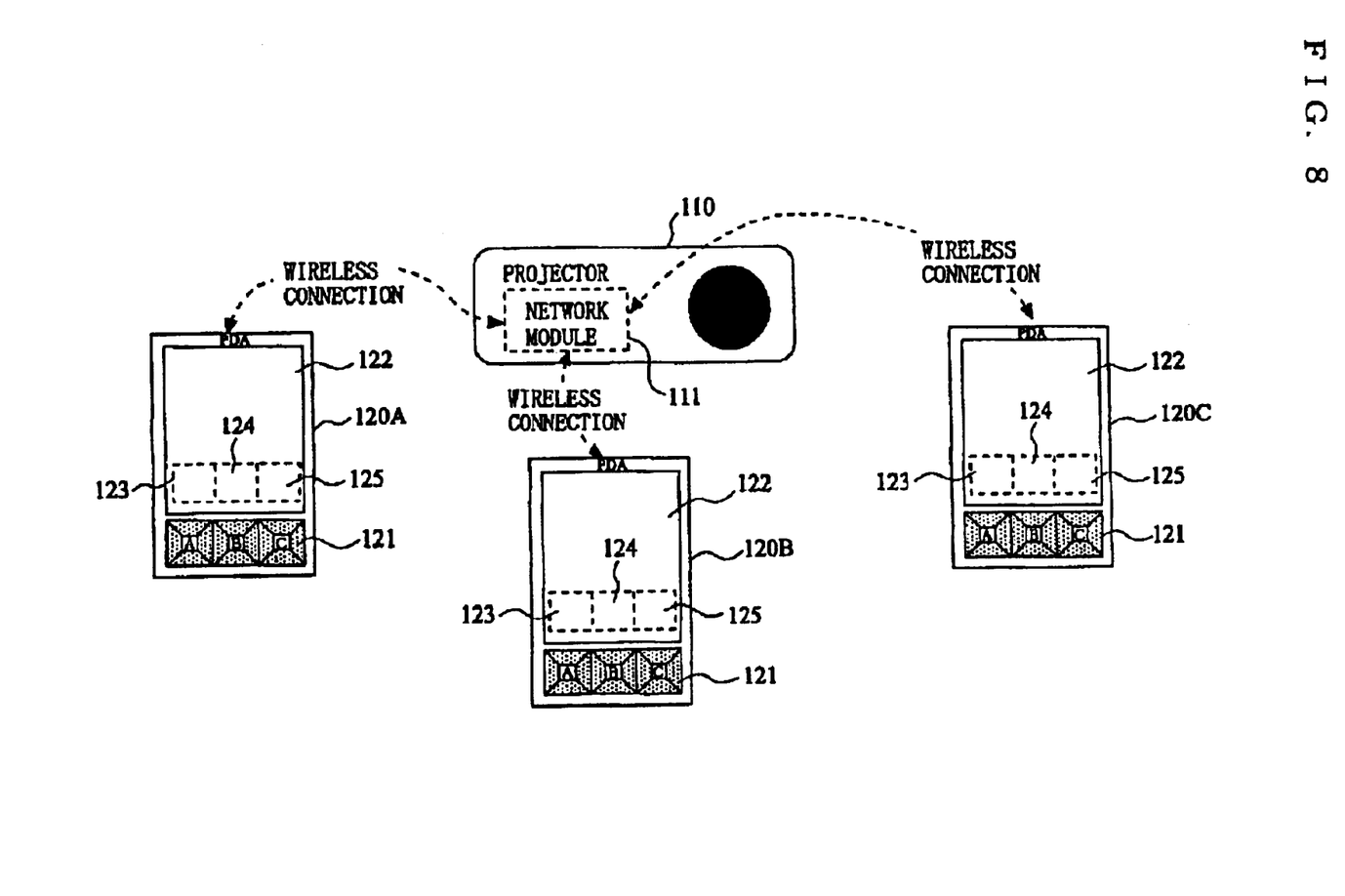
FIG. 8 is a configuration diagram of a projector wireless control system according to an embodiment of the present invention in which a plurality of mobile terminals control one unit of projector.

FIG. 8 is a configuration diagram of a projector wireless control system according to the other embodiment of the present invention. The system in FIG. 8 is a system in which a plurality of mobile terminals 120 are provided in the system in FIG. 1. Accordingly, each of the mobile terminals 120 can control the projector 110 by wirelessly connecting to the projector 110 through a network module 111 and establishing two-way communication. In this regard, here, the number of the mobile terminals 120 is three, that is, 120A, 120B, and 120C. However, the number of the terminals may be set arbitrarily.

In a system having this structure, each of the mobile terminals 120 can access the projector 110. However, when any one of the mobile terminals 120 has established a communication state with the projector 110, or a plurality of the mobile terminals 120 simultaneously have accessed the projector 110, a certain restriction can be imposed in order to prevent complication of the control. For example, when the projector 110 has established a communication enabled state with any one of the mobile terminals 120, it is possible to disable the other mobile terminals 120 to access the projector 110. Also, when a plurality of the mobile terminals 120 have simultaneously accessed to the projector 110, the mobile terminal 120 can connect to the projector in accordance with a predetermined priority of the mobile terminal 120. Furthermore, when a plurality of the mobile terminals 120 simultaneously access the projector 110, first, a connection right is given to the mobile terminal 120 which has been connected most recently by priority. If there is no such terminal, the projector 110 requests each of the mobile terminals 120 requesting connections to voluntarily refrain access, the projector 110 does not allow any one of the mobile terminals 120 to establish a communication enabled state until the number of the mobile terminals 120 requesting connections becomes one, and when that number becomes one, communication can be established with the last one. In the following, a control example of the present system will be described.

Figure 9:
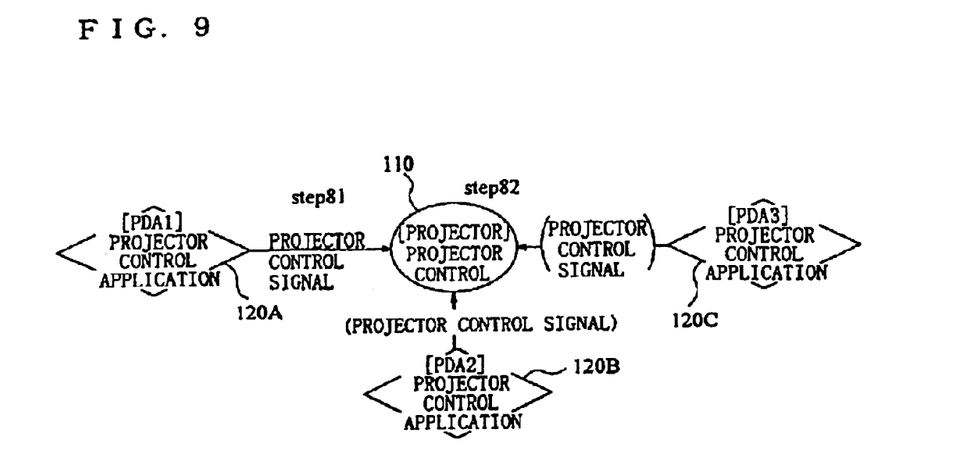
FIG. 9 is a flow diagram of a projector control by the system in FIG. 8.

FIG. 9 is a flow diagram of a projector control by the system in FIG. 8. The projector 110 can be controlled from any one of the mobile terminals 120A, 120B, and 120C. However, here, only the control signal sending from the mobile terminal 120A, which has established a communication enabled state with the projector 110 first, becomes valid (step 81), and the projector 110 is controlled based on the control signal (step 82). The mobile terminals 120B or 120C can establish a communication enabled state with the projector 110 only after the communication between the mobile terminal 120A and the projector 110 is disconnected.

Figure 10:
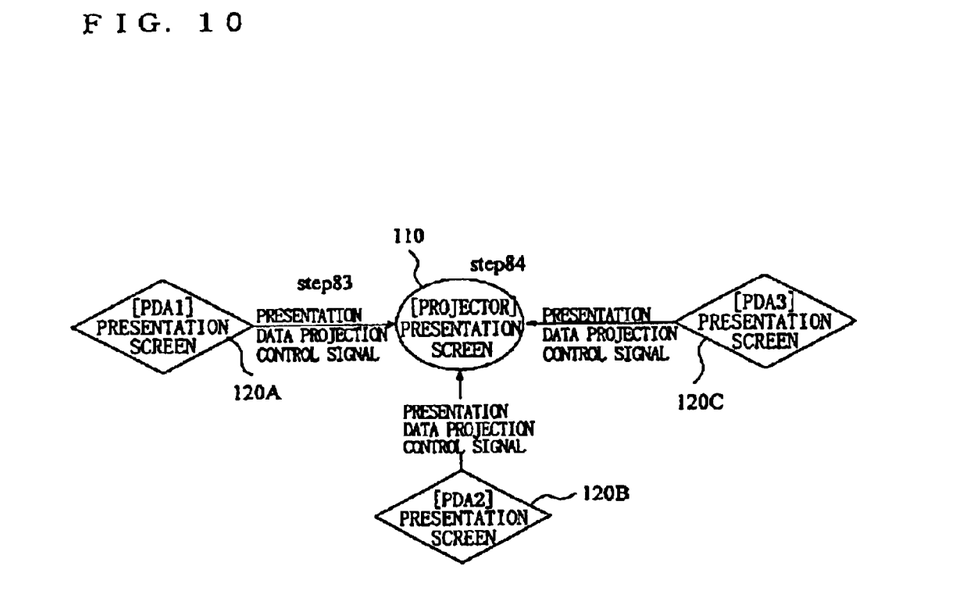
FIG. 10 is a flow diagram of projection data distribution control by the system in FIG. 8.

Also, FIG. 10 is a flow diagram of projection data distribution control by the system in FIG. 8. Data can be sent and projected to the projector 110 from any one of the mobile terminals 120A, 120B, and 120C. However, here, only the projection data and the projection control signal from the mobile terminal 120A, which has established a communication enabled state with the projector 110 first, becomes valid (step 83), and the projection data is projected based on the projection control signal. The mobile terminals 120B or 120C can establish a communication enabled state with the projector 110 only after the communication between the mobile terminal 120A and the projector 110 is disconnected.

By controlling the system in FIG. 8 as described in FIG. 9 or 10, only one mobile terminal simultaneously access the projector, and thus the projector can be prevented from being controlled disorderly.

At the same time, the projector 110 can simultaneously establish a communication enabled state with a plurality of the mobile terminals 120. This method can be used effectively when simultaneously projecting each of the data which have been sent from a plurality of the mobile terminals 120. Here, a description will be given of the projection control.

Figure 11:
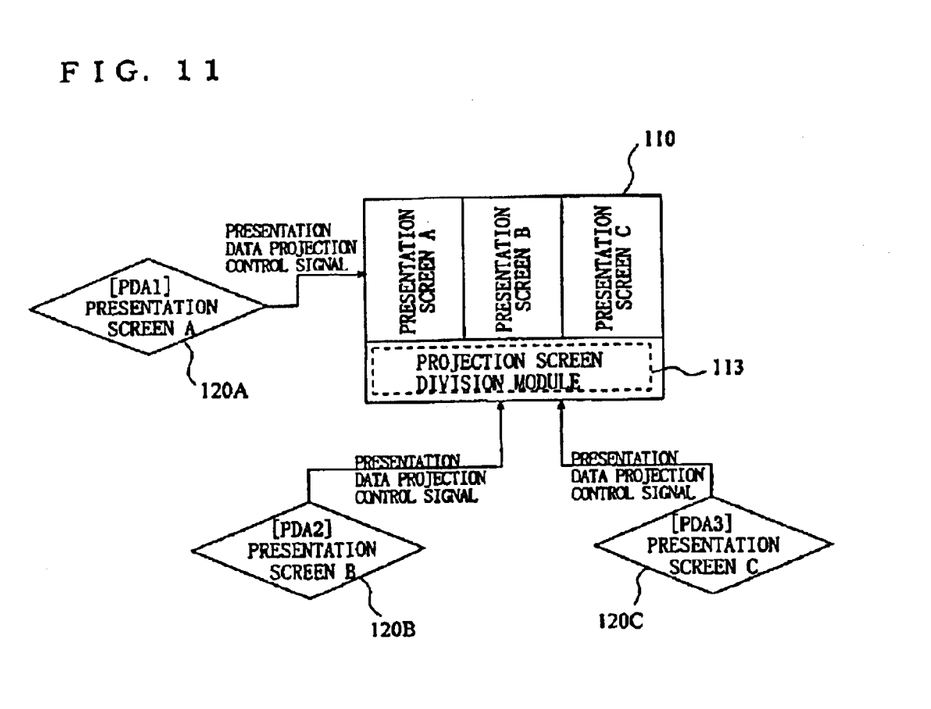
FIG. 11 is a schematic diagram illustrating a projector projection example by projection data distribution control by the system in FIG. 8.

FIG. 11 is a schematic diagram illustrating a projection example by projection data distribution control by the system in FIG. 8. As shown in FIG. 11, the projector 110 includes a projection screen division module 113 which projects different projection data by dividing a screen. By sending projection data and a screen division projection control signal from each of the mobile terminals 120A, 120B, and 120C to the projector 110, the projection screen division module 113 is operated to simultaneously align each projection data on the projector 110, that is, to project data with dividing the screen. The screen division projection control signal is a control signal which is used, when data projection has already been executed by the projector 110, for giving a projection space on the projection screen for the data which is sent later, and projecting the data sent later in the space.

By controlling the system in FIG. 8 in this manner, the images requested for projection by a plurality of mobile terminals are all projected onto the same screen. Thus multiple projection data can be shared promptly to compare and reference with each other.

Fourth Embodiment

Figure 12:
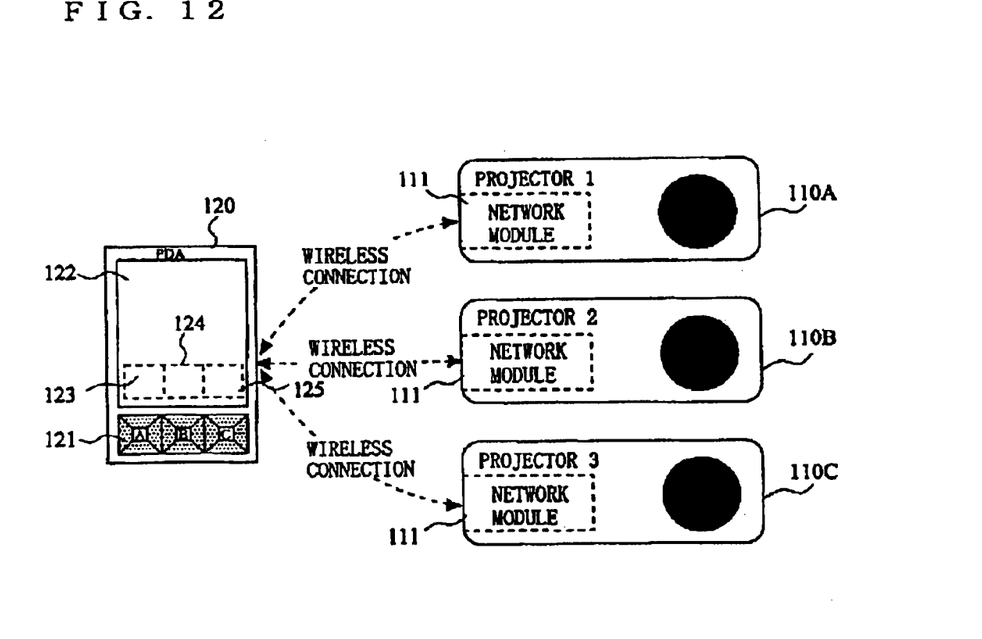
FIG. 12 is a configuration diagram of a projector wireless control system according to an embodiment of the present invention in which one unit of mobile terminal controls a plurality of projectors.

FIG. 12 is a configuration diagram of a projector wireless control system according to the other embodiment of the present invention. The system in FIG. 12 is a system in which a plurality of projectors 110, which can be controlled by establishing two-way communication through wireless connection to the mobile terminal 120, are provided in the mode in FIG. 1. In this regard, here, the number of the projectors 110 are set to three, that is, 110A, 110B, and 110C, however, the number of the projectors may be set arbitrarily. In the following, a description will be given of the control example of the system.

Figure 13:
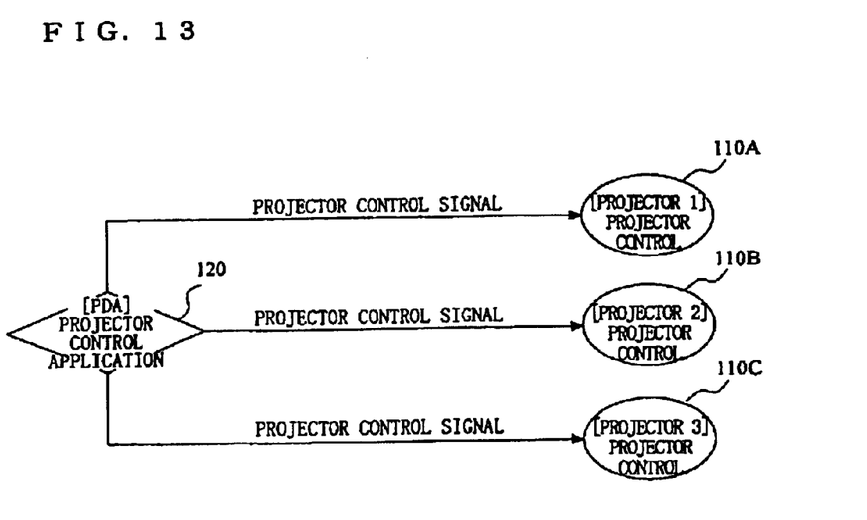
FIG. 13 is a flow diagram of projector control by the system in FIG. 12.

FIG. 13 is a flow diagram of projector control by the system in FIG. 12. In FIG. 13, when the mobile terminal 120 wirelessly sends a projector control signal to control the three projectors 110A, 110B, and 110C, each of the projectors 110A, 110B, and 110C operates in accordance with the projector control signal. In this case, three projectors may be controlled individually, or may be controlled all together. In this regard, this control is performed using the projector control application 123 included in the mobile terminal 120.

Figure 14:
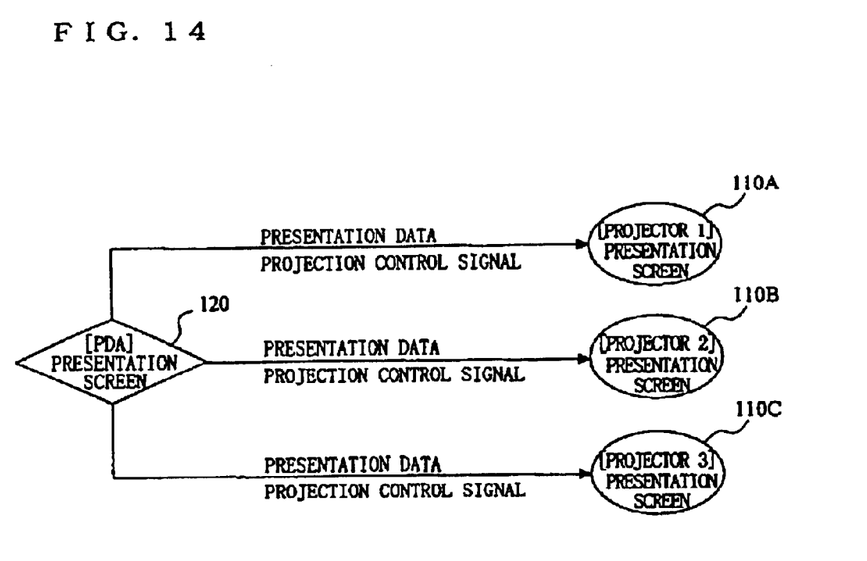
FIG. 14 is a flow diagram of projection data distribution control by the system in FIG. 12.

FIG. 14 is a flow diagram of projection data distribution control by the system in FIG. 12. In FIG. 14, when the mobile terminal 120 wirelessly sends the projection data and a projection control signal to the projectors 110A, 110B, and 110C, each of the projectors 110A, 110B, and 110C projects the projection data based on the projection control signal. In this case, three projectors may be controlled individually, or may be controlled simultaneously. In this regard, this control is performed using the projector control application 123 and the file move control application 124 included in the mobile terminal 120.

By the present invention, projector projection control, and/or projection data sending/receiving or transfer control, etc. can be executed at a remote place from the projector, and thus operationality of the projector can be improved.

For example, the mobile terminal and projector are wirelessly connected, thus the number of disposition units and disposition locations of the mobile terminals and projectors are not restricted, and thus it become possible to send the control signal and the projection data from a plurality of mobile terminals to the projector.

Also, it becomes easy to execute presentations in which many people are involved, to promptly disclose the projection data held by a plurality of persons, and to centrally manage the projection data.

What is claimed is:

1. A projector wireless control system comprising:
   a projector which includes a network module for communicating with another device, and projects projection data; and
   a plurality of mobile terminals, each of the plurality of mobile terminals includes a projector control function for controlling operation of the projector, and is wirelessly connected to the projector, allowing two-way communication with the projector through the network module;
   wherein the projector establishes the two-way communication enabled state with one of the module terminals based on a request from the mobile terminal.

2. A projector wireless control system according to claim 1,
   wherein the mobile terminal includes a function of causing the projector to project projection data which the projector has possessed.

3. A projector wireless control system according to claim 1, wherein the mobile terminal includes a function of sending projection data wirelessly to the projector.

4. A projector wireless control system according to claim 1, wherein the mobile terminal includes a display unit, and has a function of wirelessly sending an image to be displayed on the display unit to the projector and causing the sent image to be projected on the projector.

5. A projector wireless control system according to claim 1, wherein the mobile terminal includes a display unit, and has a function of wirelessly receiving an image, which is projected on the projector and displaying the received image, on the display unit.

6. A projector wireless control system according to claim 1, further comprising: a projection data storage server which is connected to the projector through the network module, wherein the mobile terminal has a function of causing the projector to send/receive projection data to/from the storage server.

7. A projector wireless control system according to claim 1, wherein the mobile terminal includes a remote control function of performing projection operation of the projector.

8. A projector wireless control system according to claim 1, wherein the mobile terminal includes a tablet function of entering a drawing capable of being projected by the projector.

9. A projector wireless control system according to claim 1, wherein the mobile terminal includes a keyboard function of entering information to the projector.

10. A projector wireless control system according to claim 1, wherein the plurality of the projectors are provided for one unit of the mobile terminal.

11. A projector wireless control system comprising:
   a projector which includes a network module for communicating with another device, and projects projection data; and
   a plurality of mobile terminals, each of the plurality of mobile terminals includes a projector control function for controlling operation of the projector, and is wirelessly connected to the projector, allowing two-way communication with the projector through the network module, wherein each of the plurality of mobile terminals sends a control signal, based on a priority, to the projector to control the projector.

12. A method of controlling a projector wirelessly, which uses a system comprising:
   a projector which includes a network module for communicating with another device and projects projection data; and
   a plurality of mobile terminals, each of the plurality of mobile terminals includes a projector control function for controlling operation of the projector, and is wirelessly connected to the projector for allowing two-way communicating with the projector through the network module,
   wherein the method comprises a step of establishing the two-way communication enabled state with one of the mobile terminals based on a request from the mobile terminal and a step of controlling the projector to project the data, by the terminal.

13. A method of controlling a projector wirelessly according to claim 12, further comprising:
   a sending step in which the mobile terminal sends a projection control signal to the projector; and
   a projecting step in which the projector projects projection data, which the projector has possessed, based on the projection control signal.

14. A method of controlling a projector wirelessly according to claim 12, further comprising:
   a sending step in which the mobile terminal sends projection data and a projection control signal to the projector; and
   a projecting step in which the projector projects the sent projection data based on the projection control signal.

15. A method of controlling a projector wirelessly according to claim 12, further comprising: a sending step in which the mobile terminal sends a projection data transfer signal to the projector; and a sending step in which the projector sends projection data, which the projector has possessed, to the mobile terminal based on the projection data transfer signal.

16. A method of controlling a projector wirelessly according to claim 12 wherein the mobile terminal includes a display unit, said method further comprising: a sending step in which the mobile terminal sends a projection data transfer signal to the projector; a sending step in which the projector sends projection data, which is projected on the projector, to the mobile terminal based on the projection data transfer signal; and a displaying step in which the mobile terminal displays the projection data to the display unit of the mobile terminal.

17. A method of controlling a projector wirelessly according to claim 12, in which the system further comprises a projection data storage server connected to the projector through the network module, the method further comprising: a sending step in which the mobile terminal sends a projection data read signal to the projector; and a reading step in which the projector reads projection data stored in the storage server into the projector based on the projection data read signal.

18. A method of controlling a projector wirelessly according to claim 12, further comprising: a requesting step in which the mobile terminal requests download of a predetermined application file which the projector has possessed; a sending step in which the projector sends the application file to the mobile terminal based on the request; and a providing step in which the mobile terminal receives the application file and is provided with a function based on the application file.

19. A method of controlling a projector wirelessly according to claim 18,
   wherein the application file is any one of a remote control application file for controlling projection operation of the projector: a tablet application file for entering a drawing which can be projected by the projector, and a keyboard application file for entering information into the projector.

20. A method of controlling a projector wirelessly according to claim 12, wherein one unit of the mobile terminal controls a plurality of the projectors simultaneously.

21. A method of controlling a projector wirelessly according to claim 20,
   wherein the unit of the mobile terminal sends projection data to a plurality of the projectors simultaneously to project the projection data on each of the projectors simultaneously.

22. A method of controlling a projector wirelessly, which uses a system comprising:
   a projector which includes a network module for communicating with another device and projects projection data; and
   a plurality of mobile terminals, each of the plurality of mobile terminals includes a projector control function for controlling operation of the projector, and is wirelessly connected to the projector for allowing two-way communication with the projector through the network module, wherein the method comprises a step of wirelessly sending a control signal, based on a priority, from each of the plurality of mobile terminals to the projector to control the projector.

23. A method of controlling a projector wirelessly according to claim 22, wherein, the connection request is not accepted by the projector in the case when the projector is in a communication enabled state with any one of the mobile terminals.

24. A method of controlling a projector wirelessly according to claim 23, wherein, when a plurality of the mobile terminals send connection requests to the unit of the projector simultaneously, a communication enabled state is established between a mobile terminals and the projector in accordance with a predetermined priority.

25. A method of controlling a projector wirelessly according to claim 23, wherein, when a plurality of the mobile terminals send connection requests to one unit of the projector simultaneously, the projector gives a warning to stop the connection request to each mobile terminal until when only one mobile terminal sends a connection request, and, when only one mobile terminal sends a connection request, the mobile communication enabled state is established between the projector and the mobile terminal.

26. A method of controlling a projector wirelessly according to claim 22, wherein, when a plurality of the mobile terminals send projection data and a projection control signal to the projector, the projector projects a plurality of each projection data onto one projection screen dividedly.

* * * * *